Figure 6:
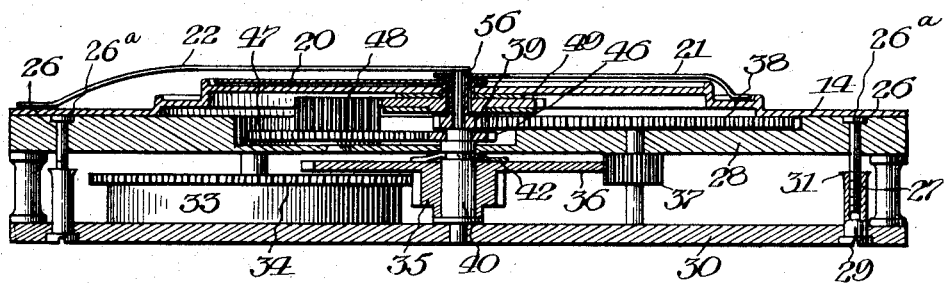

H. A. BORRESEN.
HOROLOGICAL INSTRUMENT.
APPLICATION FILED APR. 14, 1911.
1,203,690.
Patented Nov. 7, 1916.
5 SHEETS—SHEET 1.
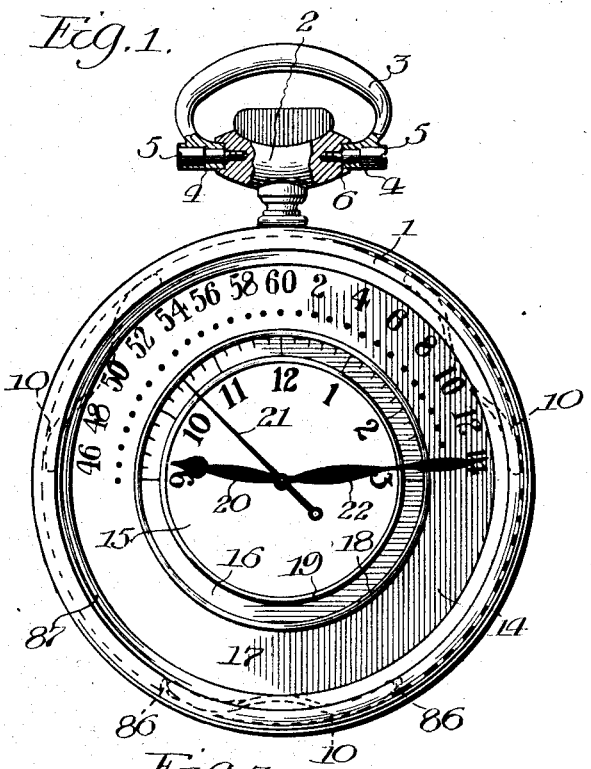
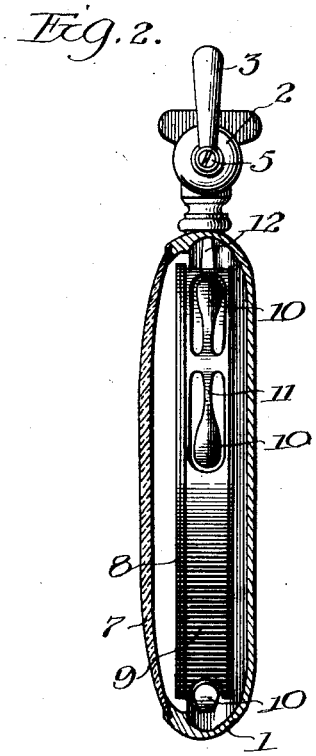
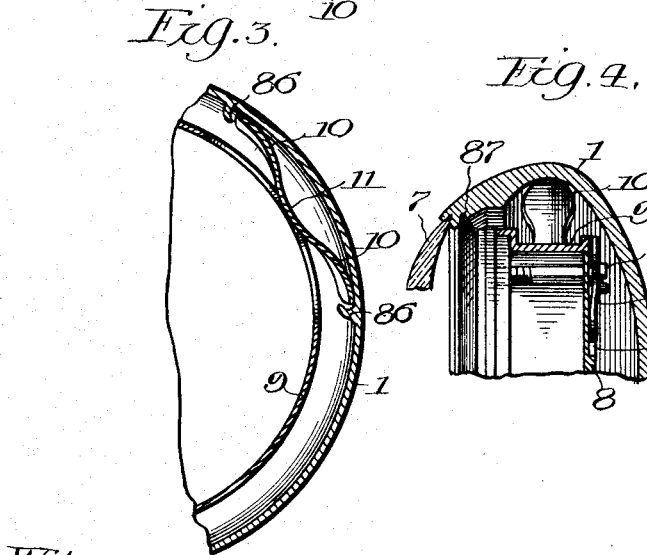
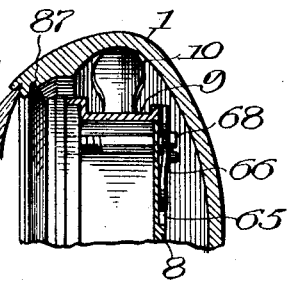
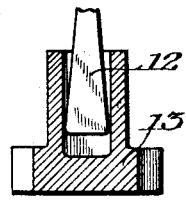
Witnesses
O. W. Wernich
Hazel Jones
Inventor
Helge A. Borresen
by May W. Zabel
Atty.

H. A. BORRESEN.
HOROLOGICAL INSTRUMENT.
APPLICATION FILED APR. 14, 1911.

1,203,690.

Patented Nov. 7, 1916.
5 SHEETS—SHEET 2.

Witnesses
C. M. Nemnich
Hazel Jones

Inventor
Helge A. Borresen
by May W. Zabel
Atty.

H. A. BORRESEN.
HOROLOGICAL INSTRUMENT.
APPLICATION FILED APR. 14, 1911.

1,203,690.

Patented Nov. 7, 1916.
5 SHEETS—SHEET 3.

Witnesses
O. W. Wennick
Hazel Jones

Inventor
Helge A. Borresen
by Max W. Zabel
Atty

H. A. BORRESEN.
HOROLOGICAL INSTRUMENT.
APPLICATION FILED APR. 14, 1911.
1,203,690.
Patented Nov. 7, 1916.
5 SHEETS—SHEET 4.
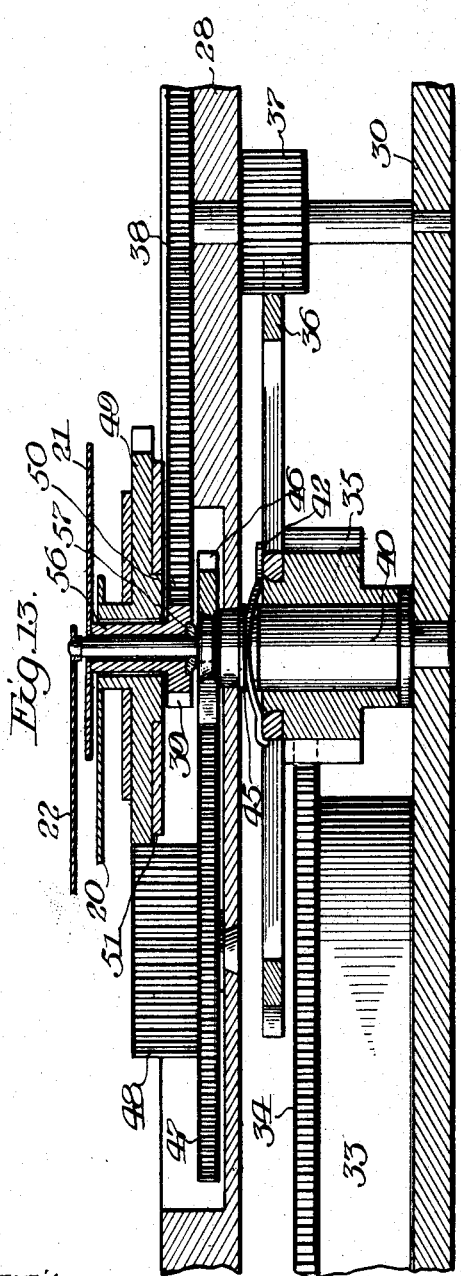
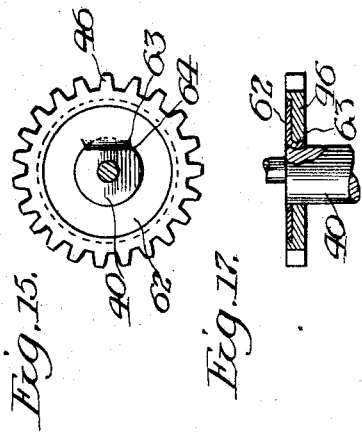
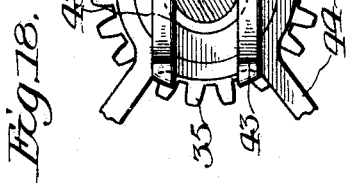
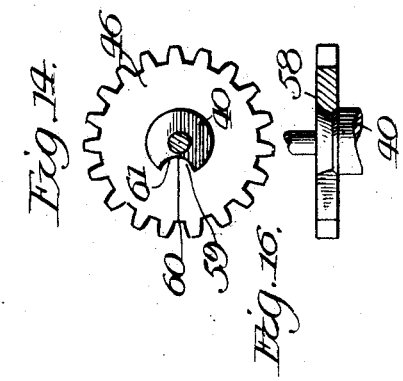
Inventor
Helge A. Borresen
by May W. Zabel
Attys.

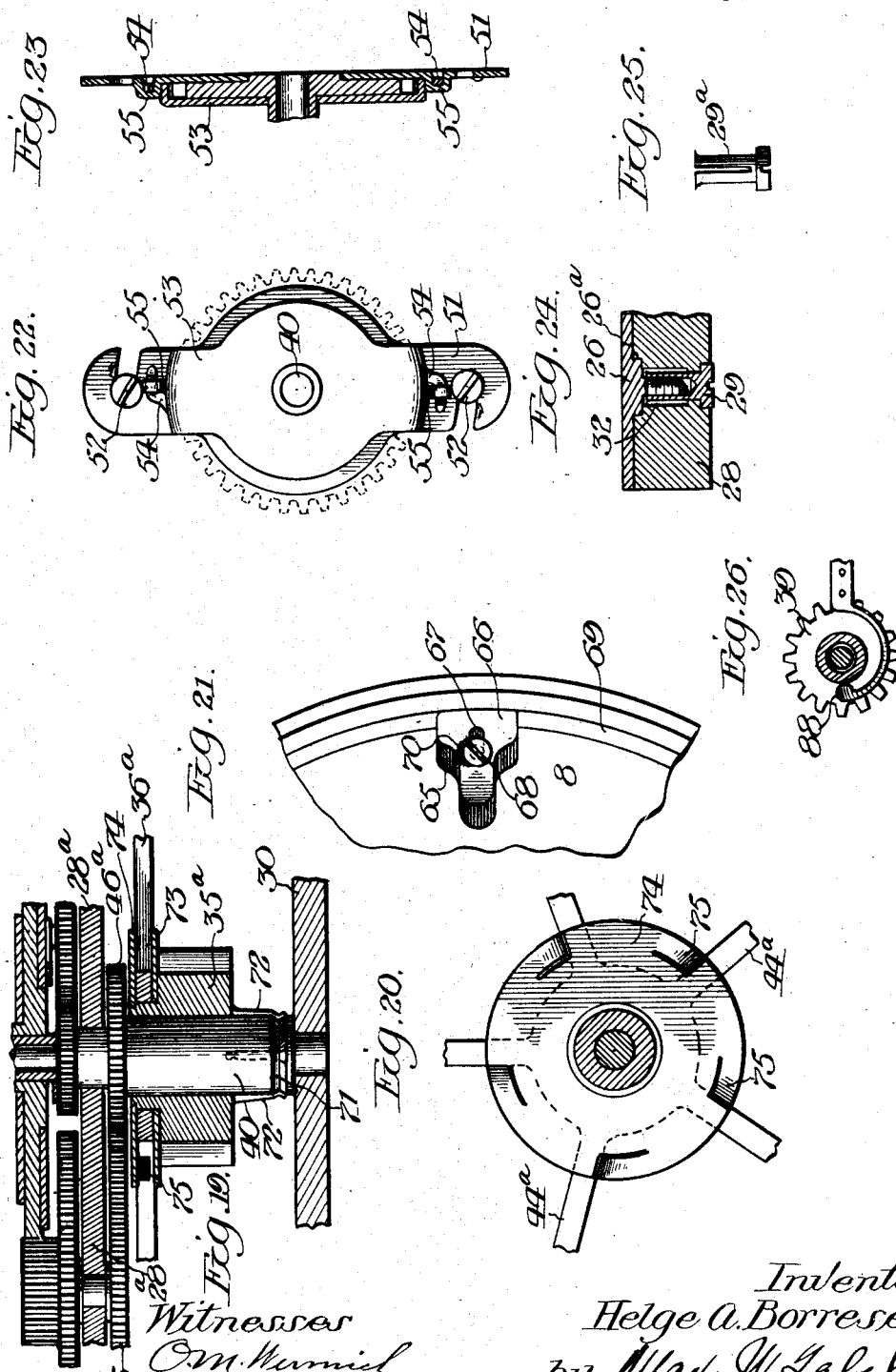

UNITED STATES PATENT OFFICE.

HELGE A. BORRESEN, OF MARQUETTE, MICHIGAN, ASSIGNOR TO MAX W. ZABEL, TRUSTEE, OF CHICAGO, ILLINOIS.

HOROLOGICAL INSTRUMENT.

1,203,690.            Specification of Letters Patent.          Patented Nov. 7, 1916.

Application filed April 14, 1911. Serial No. 620,965.

*To all whom it may concern:*

Be it known that I, HELGE A. BORRESEN, a citizen of the United States, residing at Marquette, in the county of Marquette and State of Michigan, have invented a certain new and useful Improvement in Horological Instruments, of which the following is a full, clear, concise, and exact description, reference being had to the accompanying drawings, forming a part of this specification.

My invention relates to horological instruments and has for its object the provision of improved instruments of this character greatly simplified and capable of rendering a more highly efficient service.

This invention has for one of its objects the provision of an improved safety pendant bow.

My invention furthermore has for its object the provision of resilient means provided within the cases for watches or similar instruments to prevent injury to the interior mechanisms by shocks or jars against the exterior casing.

My invention further has for its object the provision of means to increase the available dial space.

My invention furthermore has for its object the provision of improved guide tracks for hands of time pieces, and in one of its forms provides a dial with raised concentric tracks for the different hands, the elevation of the respective tracks being toward the center. This provides improved dial facilities and at the same time increases the space within which is available for the working mechanism.

My invention furthermore contemplates the provision of improved winding facilities available for use with resiliently mounted working mechanism.

My invention has for a further object improved means for fastening a dial, and also improved means for fastening the movement within the case.

My invention has for a further object the provision of an improved recoil center pinion structure.

My invention further contemplates improved frictional driving mechanisms.

My invention has for a further object improved removable mounting facilities for wheels or pinions.

It is a prime object of my invention to provide improved hand mounting mechanism, and the coöperating parts in connection therewith so that I may incorporate the second hand concentrically and between the hour and minute hands, and my invention further contemplates improved dial arrangements applicable to these constructions and arrangements. Improved bearing facilities are one of the results of this rearrangement.

My invention in one of its forms likewise contemplates a separate and distinct bearing mechanism independent of the center for one of the concentrically mounted driving sleeves.

My invention further contemplates improved facilities for guiding the hands over raised pyramid-like dial tracks.

In my present application I have confined myself to claims covering means for supporting a watch movement resiliently within the watchcase.

Figure 7:
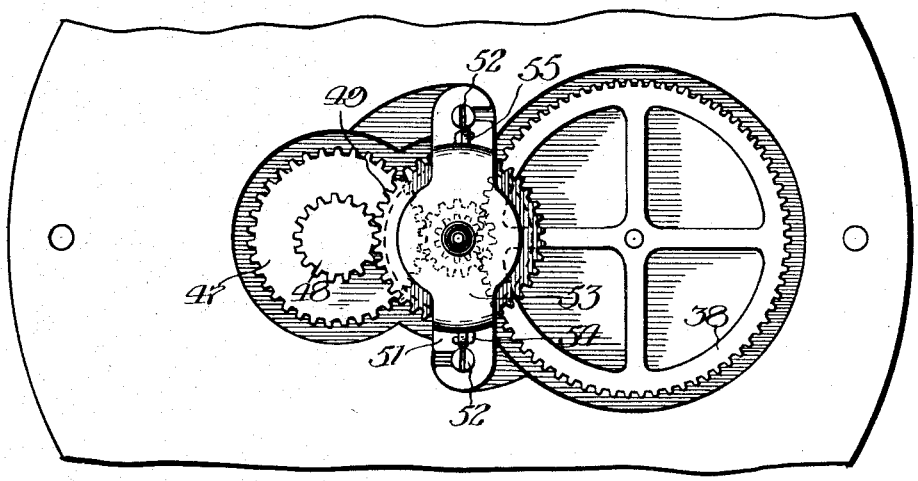
Figure 8:
Figure 9:
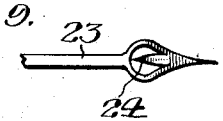
Figure 10:
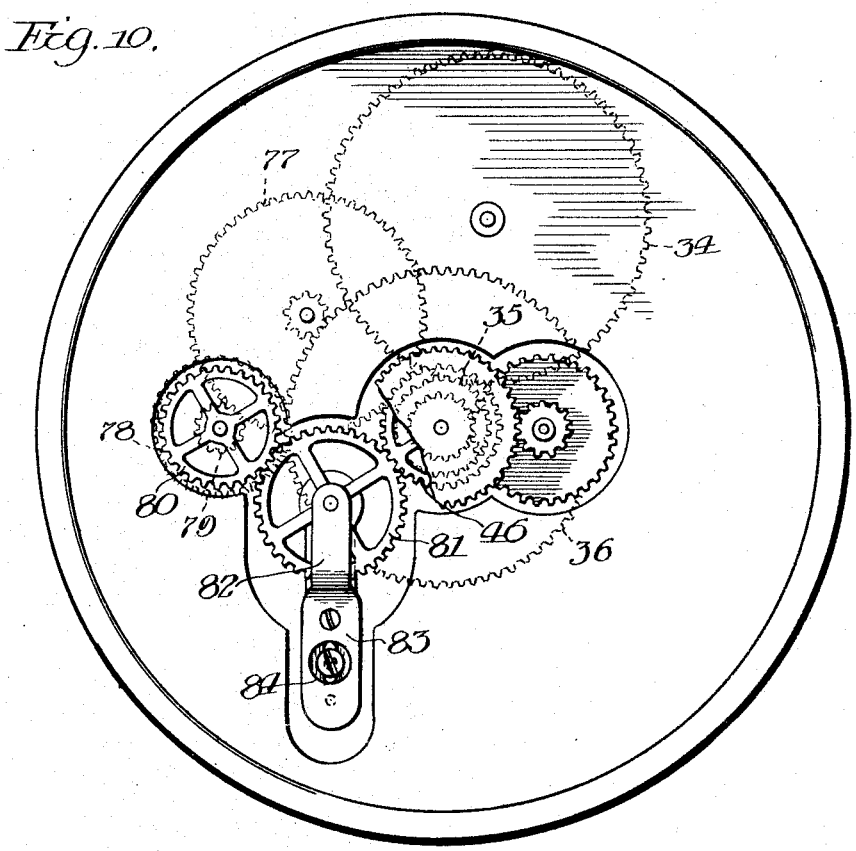
Figure 11:
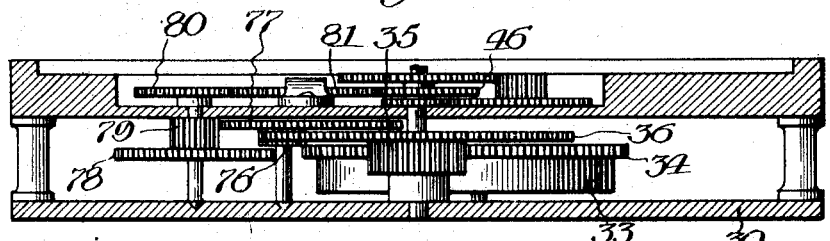
Figure 12:
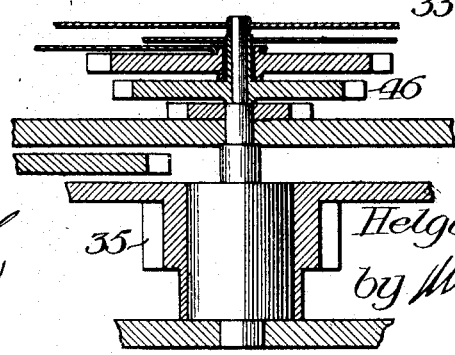

With these and other objects in view, my invention consists in the improved arrangement and construction of the parts as will all appear more clearly hereinafter in the description thereof which I will now set forth in connection with the accompanying drawings forming part of this specification, in which:

Figure 1 is a front view of a horological instrument constructed in accordance with my invention; Fig. 2 is a view partly in section of my improved resilient mounting mechanism with the dial removed; Fig. 3 is a detail view thereof; Fig. 4 is a further detail of construction; Fig. 5 is a detail view of the winding mechanism; Fig. 6 is a sectional view of an instrument constructed in accordance with my invention; Fig. 7 is a detail view of a portion of the operating mechanism shown in features of construction; Fig. 8 is a detail view of the hand guiding mechanism; Fig. 9 is a detail view of a hand; Fig. 10 is a top view of portions of the operating mechanism, the driving mechanism being clearly illustrated; Fig. 11 is a side view partly in section of a form of a driving mechanism for operating a concentric second hand from the fourth wheel; Fig. 12 is a detail view of the central hand driving mechanism of Fig. 11; Fig. 13 is a sectional view illustrating my improved frictional driving mechanism; Fig. 14 is a view of my improved detachable minute pinion and associated mechanism;

Fig. 15 is a modified form thereof; Figs. 16 and 17 are side sectional views respectively of the structures set forth in Figs. 14 and 15; Fig. 18 is a top view of a portion of my improved frictional driving mechanism set forth in Fig. 13; Fig. 19 is a detail view of a combined frictional minute pinion drive and combined recoil center pinion; Fig. 20 is a detail view of the recoil mechanism; Fig. 21 is a detail view of the movement holding device; Fig. 22 is a detail view of my improved bearing or supporting device; Fig. 23 is a sectional view of the structure set forth in Fig. 22; Fig. 24 is a detail view of a modified form of dial holding means; Fig. 25 is a modified form of the structure set forth in Fig. 24; and, Fig. 26 is a detail view of the concentric second hand pinion motion guide.

Referring more particularly to Figs. 1, 2, 3, 4 and 5, I show a watch having a case 1, a pendant 2, which pendant is provided with a bow 3 adapted to be removably mounted to the pendant by the improved mechanism illustrated herewith. This improved mechanism includes lugs 4, 4 which in the form shown herein are adapted to project into sockets provided in the pendant 2 and are held therein by means of screws 5, 5. These screws 5 are rotatable loosely within the lugs 4, but are adapted to screw threadedly engage the pendant, and by means of the shoulders 6 are adapted to be screwed tightly into the pendant and held therein without danger of removal due to the swinging action of the bow 3. This immunity to removal is due to the coöperation between the shoulder 6 and the screw threaded mounting of the screw 5 within the pendant.

My improved watch or timepiece has likewise a crystal 7, which crystal and case together form a closed receptacle for the works 8. These works are generally fastened directly to the case and thus are subject to all of the shocks and jars to which the watch case is subject. In order to relieve the movement 8 of these shocks, I provide a band 9 which may be of resilient material which has pushed therefrom resilient arms 10, 10, which arms project upwardly as shown more clearly in Fig. 3, and engage the interior periphery of the case. These arms are preferably thinned as shown at 11 so that the movement 8 is resiliently mounted within the case and may yield readily radially or in a line parallel with the axis of the watch whenever the case is unduly subjected to shocks, or otherwise violently agitated. The works 8 being resiliently mounted, I provide improved means for winding the spring within the said movement, which means are yielding so that the relative movement between the works and the case will not disturb the proper coöperation between these said parts. To this end the stem 12 is formed in the shape of a truncated pyramid as shown more clearly in Fig. 5, and engages a socket 13 having a hollow interior of rectangular cross-section of substantially the size of the lower end of the stem 12. It will be seen that the stem 12 can move longitudinally in the socket 13 and is also capable of maintaining its proper connection with the socket 13, even should said socket be angularly moved upon a relative movement between the case and works 8. This prevents breakage of the stem under such circumstances.

I provide an improved dial 14 which is shown more clearly in Figs. 1 and 6, which dial is formed pyramid-like of concentric raised portions sloping downwardly toward the periphery. I provide three tracks respectively 15, 16 and 17 in different planes, and two of these tracks are surrounded concentrically by rails respectively 18 and 19. The track 15 is designed for coöperation with the hour hand 20 and the track 16 is designed for coöperation with the second hand 21. The track 17 is designed for coöperation with the minute hand 22. The hour hand is preferably guided upon the track 15 and is safe guarded against interference from the second hand 21 by virtue of the rail 19. Similarly the second hand coöperates with the track 16 and the rail 18 serves as a guard.

It will be apparent from Fig. 6 that with the aid of the construction thus set forth considerable space is provided immediately below the tracks 15 and 16, which is very advantageously occupied by a portion of the movement mechanism.

In Fig. 8 I set forth an alternative structure of the dial in which the hand 23 is provided with a downwardly projecting arm 24 that may engage an overhanging portion 25 extending from the rail 19. In this manner the hand may be guided by the rail in such a way as to not only limit its downward movement, but also its movement away from the dial. The structure of this hand is set forth a trifle more in detail in Fig. 9. I show further in Fig. 6 improved means for supporting the dial 14, which means consists of pins 26 fastened to the dial 14, which pins have screw threaded extremities 27. These pins project through the front plate 28 and are engaged at their screw threaded extremities by means of nuts 29 passing through the rear plate 30. These nuts are interiorly threaded to engage the pins 26 and to draw the dial tightly into position. The nuts 29 are provided with falling shoulders 31 which prevent them from falling out of the plate 30 when they are disengaged from the pins 26. These shoulders 31 are preferably provided after the nuts 29 have been inserted through the plate 30. In this manner I am enabled to provide a structure by means of which the dial may be readily removed, and as readily replaced a great many times without removing the movement from the case. In order that the drawing stress exerted by nuts 29 on pins 26 shall not be communicated to the dial 14, I provide the shoulders 26ª on the pins 26. These shoulders 26ª rest against the movement plate 28 and in this manner the tension is on the shoulders 26ª and not on the dial.

In Fig. 24 I set forth a modified structure in which the nut 29 is provided directly in the front plate 28 within a cylindrical aperture 32 provided therein.

In Fig. 25 I set forth a nut 29ª which is similar to the nut 29 except that its screw threaded portion is split so that the said screw threaded portions may be adjusted to the wear of the screw 26, and proper gripping effort maintained in order to prevent the nut 29 from accidentally working loose.

As stated in connection with Fig. 1, the second hand is designed to operate preferably between the hour and minute hands, and this is accomplished by means of the improved structure and associated apparatus as set forth in Fig. 13. In this figure the driving spring 33 carries the customary gear wheel 34 which operates the center pinion 35. The center pinion 35 carries fixedly secured thereto the center wheel 36 which engages the pinion 37 to thereby drive the gear wheel 38 and therewith the concentric second hand pinion 39, the advantages of which will be detailed hereinafter. The center pinion 35 is mounted upon the center or minute arbor 40 which is provided with bearing surface both in the plate 28 and the plate 30 as illustrated herein. This center pinion carries the minute hand 22 at its upper extremity and carries as before stated the center pinion 35.

In order to provide motion transmitting mechanism between the arbor 40 and the pinion 35, I utilize frictional devices, one embodiment of which is set forth more clearly in Figs. 13 and 18, and consists in this embodiment of a U-shaped spring 41 whose heel portion 42 rests against the top of the center pinion 35 and center wheel 36 and whose arms 43 extend beyond the hub edge of the center wheel 36 and are held in place by the spokes 44 thereof. The arms 43 are rounded as shown in Fig. 13 and engage the upper inner surface of an annular groove 45 provided in the center arbor 40, the spring action of the arms 43 being sufficient when thus engaging the various parts to transmit the rotary motion of the center pinion 35 to the center arbor 40. The arms 43 are also so proportioned that they exert an inward radial gripping stress against the center arbor 40 to provide additional frictional effort. The center arbor 40 carries a gear wheel 46 which meshes with wheel 47 carrying the pinion 48. The gear wheel 48 drives the gear wheel 49 which carries the hour hand 20. This gear wheel 49 has a bearing disk 50 as more clearly illustrated in Figs. 22 and 23 which is superposed in a bridge 51 and rotatably mounted therein. The bridge 51 is held in place by means of two screws 52, 52 as more clearly illustrated in Fig. 7. Superposed on top of the gear wheel 49 to suitably hold the same within the bearing provided by the bridge 51 is a cap 53 through which the center arbor 40 passes and which is held in place upon the bridge 51 by means of the lugs 54 which engage the eyes 55 provided upon the bridge 51. By thus providing the bridge structure for the hour wheel so that it is independently mounted, this hour wheel is prevented from wabbling and can thus guide the hour hand perfectly in a parallel plane of the dial, and at the same time provide the proper end play of the hour wheel.

It will thus be apparent that the concentric hour hand driving sleeve carried by the gear wheel 49 is independently mounted, and thus is relieved from any association with a concentric bearing. This is of great advantage in permitting a centrally located concentric second hand driving sleeve 56 to be free from any contact with the said hour wheel mechanism.

On account of the great ratio the power available to drive the second hand is very slight and therefore this second hand sleeve must be free from interference and must be mounted to rotate very freely. This I accomplish by operating the concentric second pinion 39 directly upon the extremely small pivotal portion of arbor 40, and to further improve the bearing qualities of the pinion 39 the jewel bearing 57 may be incorporated therewith as shown clearly in Fig. 13.

The gear wheel 46 is fastened to the center arbor 40 in an improved manner so that it is readily removable and the structure by virtue of which I obtain this result is indicated more clearly in Figs. 13 and 16 where the said arbor 40 has a cone shaped portion 58 where said gear wheel is to be mounted, which cone shaped portion is provided with a slot 59. The gear wheel 46 itself is slotted at 60 and has inwardly projecting ears 61 conforming in general outline to the outline of the slot 59. This gear wheel 46 is made of springy material so that it can be sprung into position about the arbor 40 by virtue of the split character of the said gear. The spring action of the said gear serves to hold the same in position and also permits of ready removal of the said gear wheel for purposes of inspection and repair. The ears 61 are also of particular advantage when the hands are being set so that these ears may be against the sides of the groove 59 when the said gear wheel 46 is being turned to set the hands, the said ears preventing any undue movement between the adjoining portions of the gear where they are split, as shown at 60.

In Figs. 15 and 17, I show an alternative construction in which the gear wheel 46 has a superposed plate 62 which has a downwardly projecting ledge 63 adapted to engage a squared portion 64 of the center driving arbor 40. Preferably by spring action the plate 62 thus retains the gear wheel 46 in place. The squared portion 64 is preferably rounded as shown in Fig. 17, more thoroughly to hold the parts together.

In Fig. 21 I set forth an improved construction for holding the movement in place within the watch case. To this end the back plate of the movement 8 is provided with a recessed portion 65 which is adapted to receive a T shaped plate 66 having a slot 67 therein. A screw 68 provided in the lowest plate serves to hold the plate 66 in place. This plate 66 is adapted to be moved toward the left so that the movement can be removed from the case. After the movement has been inserted, and it is desired to fasten the same, the plate 66 is moved radially outwardly to engage the flange 69 in the case and the screw 68 is then fastened down to hold the movement in place. In this way the movement can be fastened without entirely removing the screw 68. The plate 66 is rounded slightly and has a roughened top surface at 70 so that this plate may respond automatically to the movement of the screw, the loosening of the screw drawing the said plate inwardly and the fastening of said screw moving the said plate outwardly. The movement track of recess 65 guides the innermost portion of plate 66 and prevents plate 66 from revolving when screw 68 is being turned. The serrated portion 70 of plate 66 also prevents screw 68 from accidentally working loose.

In Figs. 19 and 20 I show the center arbor 40 as carrying the center pinion $35^a$, which center arbor has a groove 71 by virtue of which the movement of the center pinion $35^a$ is frictionally imparted to the said center arbor 40. This is accomplished by means of the downwardly extending arms 72, 72 which are integral with the center pinion $35^a$ and which by their spring action thus secure frictional engagement with the center arbor 40. In these Figs. 19 and 20 I set forth an improved one piece center driving arbor and recoil mechanism which includes a plate 73 placed adjacent the pinion $35^a$, and upon which the center wheel $36^a$ is placed. Upon this center wheel $36^a$ I place the spring plate 74 which has prongs 75 that extend downwardly to engage the arms $44^a$ of the center wheel $36^a$. The center pinion $35^a$ has an upwardly extending sleeve to carry the washer 73, the hub of the wheel $36^a$ and the spring plate 74, which sleeve at its topmost portion is riveted around to securely hold the spring plate 74 in place. To further simplify and improve the construction the gear wheel $46^a$ which transmits the movement of the arbor 40 to the wheel 85 below the top plate $28^a$ is associated integrally with the said arbor 40. This provides a one piece friction driven center arbor and minute wheel directly assembled with a recoil center pinion and wheel, and introduced as a whole between the movement plates $28^a$ and 30, resulting in a compact hour wheel and concentric second pinion construction.

In Figs. 10, 11 and 12, I also set forth other improved means whereby the second hand may be so mounted as to rotate between the hour and minute hands, and in which the second hand may be driven by the fourth wheel. To this end the main spring 33 drives the gear wheel 34 which rotates the center pinion 35. The center pinion drives the center wheel 36 which thereupon rotates the gear wheels 76 and 77 which thereupon rotate the gear wheels 78, 79 and 80. The second hand wheel is directly mounted with respect to the gear wheel 46 and is driven from the gear wheel 80 preferably through the interposition of an adjustable gear wheel 81 mounted as shown more clearly in Fig. 10 in the bridge 82 which is universally adjustable by means of the pins 83 and the screw 84.

There is a further feature of my invention which is of great value and which will be readily apparent from an inspection of Fig. 4. It has been customary to bring the case 1 around toward the front of the watch in a manner to cover quite a substantial portion of the periphery of the dial. It is of great importance that the largest amount of dial space be available, and to this end I increase the diameter of the crystal 7 relatively to the case, and decrease the overhanging portion of the said case by providing the mounting means as shown more clearly in Fig. 4. It will be seen that with this structure the crystal 7 extends almost to the outer periphery of the case and thus leaves to open view almost the entire interior of the case, thus to largely increase the available dial space. In order that the usual open space between the front bezel and dial shall present a closed and tight fitting appearance and at the same time a more perfect means for excluding dirt from the interior mechanism, I provide the resilient reflector and dust excluding band 87, shown in Figs. 1 and 4, which in nowise interferes with the resiliency of the mounting 9. To prevent angular displacement of the resiliently mounted movement, I have provided the stop lugs 86.

In Fig. 26, I show a resilient spring 88 which serves as a concentric second hand pinion motion guide.

In thus describing my invention, I have described in detail one embodiment of each of the various features of my invention, without of course in any way intending thereby to limit myself to such embodiment or to any specific portion of the specification, as such specific description is merely given to illustrate one complete embodiment of the invention.

Having however, thus described specifically one such complete structure, what I broadly claim as new and desire to secure by Letters Patent is:

1. A watchcase providing a resilient movement support, said movement support comprising a recessed circular band adapted to engage and support a watch movement and the said circular band having extending spring members, the said spring members engaging the interior periphery of the aforesaid watchcase, the said interior periphery having coincident lugs coöperating with the said extending spring members for preventing rotary action.

2. A watchcase providing a resilient movement receptacle, comprising a circular band having perforations producing spring members and providing spaces for universal resilient action of the said spring members, the said spring members engaging the interior periphery of said watchcase, said interior periphery having definitely located lugs for engaging the aforesaid spring members so as to maintain the aforementioned resilient movement receptacle in a definite relation to the stem.

3. A watch case providing a resilient movement receptacle, comprising a circular band, a single row of circumferentially arranged spring fingers secured to said band, said spring fingers engaging the inner periphery of said watch case, and stops provided about the inner periphery of said case to be engaged by said fingers to maintain the said band in a definite relation to the stem.

4. A watch case providing a resilient movement receptacle, comprising a circular band, and a single row of circumferentially arranged spring fingers secured to said band, said spring fingers engaging the inner periphery of said watch case, said fingers having portions of restricted cross section to make them universally yieldable.

5. A watch case providing a resilient movement receptacle, comprising a circular band, a single row of circumferentially arranged spring fingers secured to said band, said spring fingers engaging the inner periphery of said watch case, stops provided about the inner periphery of said case to be engaged by said fingers to maintain the said band in a definite relation to the stem, winding means for said movement, and winding means provided in said case having means to universally engage the winding means of the movement.

6. A watch case providing a resilient movement receptacle, comprising a circular band, a single row of circumferentially arranged spring fingers secured to said band, said spring fingers engaging the inner periphery of said watch case, said fingers having portions of restricted cross section to make them universally yieldable, winding means for said movement, and winding means provided in said case having means to universally engage the winding means of the movement.

7. A watch case providing a resilient movement support, said movement support comprising a recessed circular band adapted to engage and support a watch movement and the said circular band having extending spring members, the said spring members engaging the interior periphery of the aforesaid watch case, the said interior periphery having coincident lugs coöperating with the said extending spring members for preventing rotary action, winding means for said movement, and winding means provided in said case having means to universally engage the winding means of the movement.

8. A watch case having a resilient movement receptacle, comprising a circular band having punched therefrom spring members and having additional open spaces to provide universal resilient action of the said spring members, the said spring members engaging the interior periphery of said watch case, said interior periphery having definitely located lugs for engaging the aforesaid spring members so as to maintain the aforementioned resilient movement receptacle in a definite relation to the stem, winding means for said movement, and winding means provided in said case having means to universally engage the winding means of the movement.

9. A watch case providing a resilient movement receptacle, comprising a circular band, and a row of circumferentially arranged spring fingers secured to said band, said spring fingers engaging the inner periphery of said watch case, said fingers having portions of restricted cross section to make them universally yieldable.

In witness whereof, I hereunto subscribe my name this 11th day of April, A. D., 1911.

HELGE A. BORRESEN.

Witnesses:
MAX W. ZABEL,
HAZEL JONES.